Patented May 25, 1926.

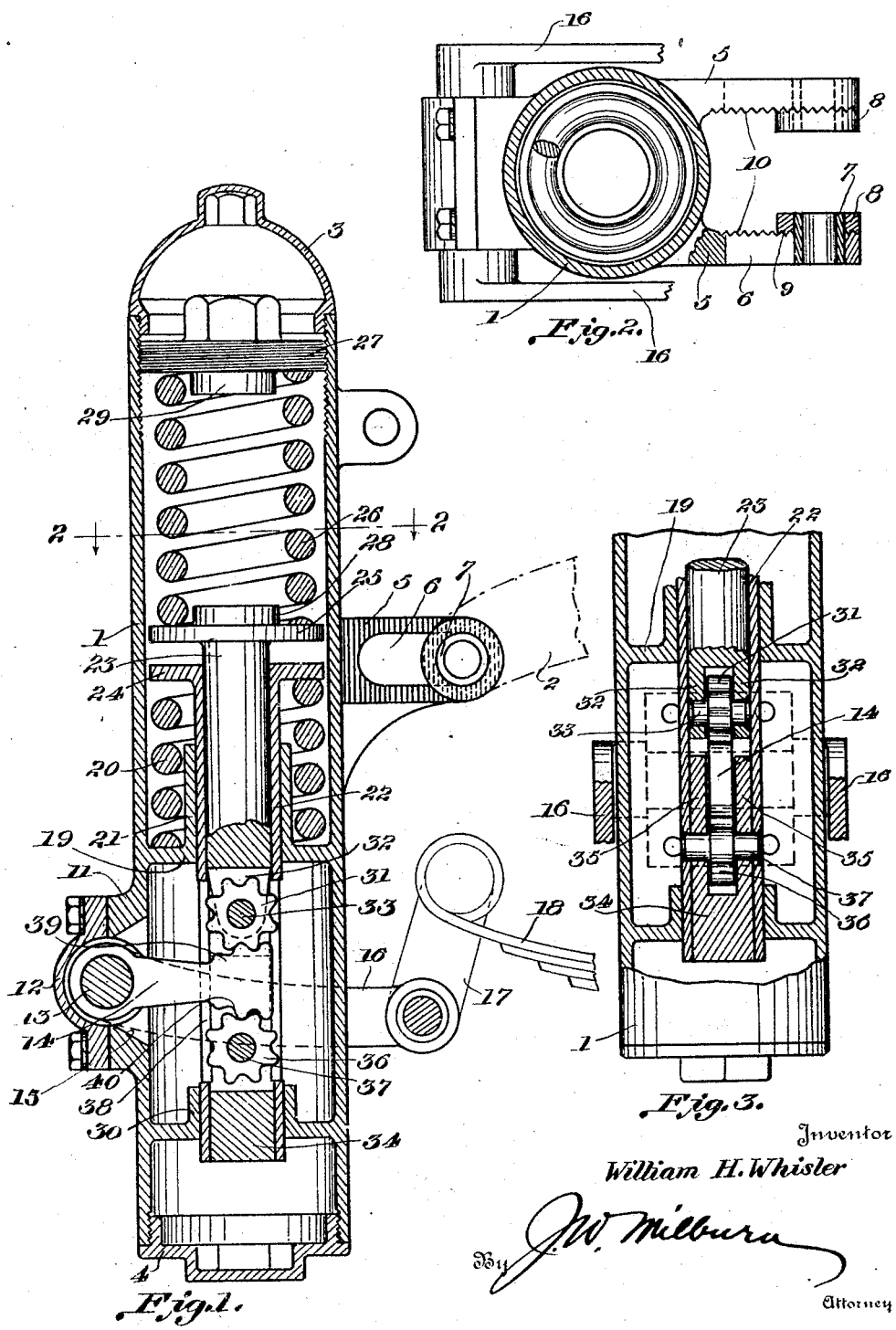

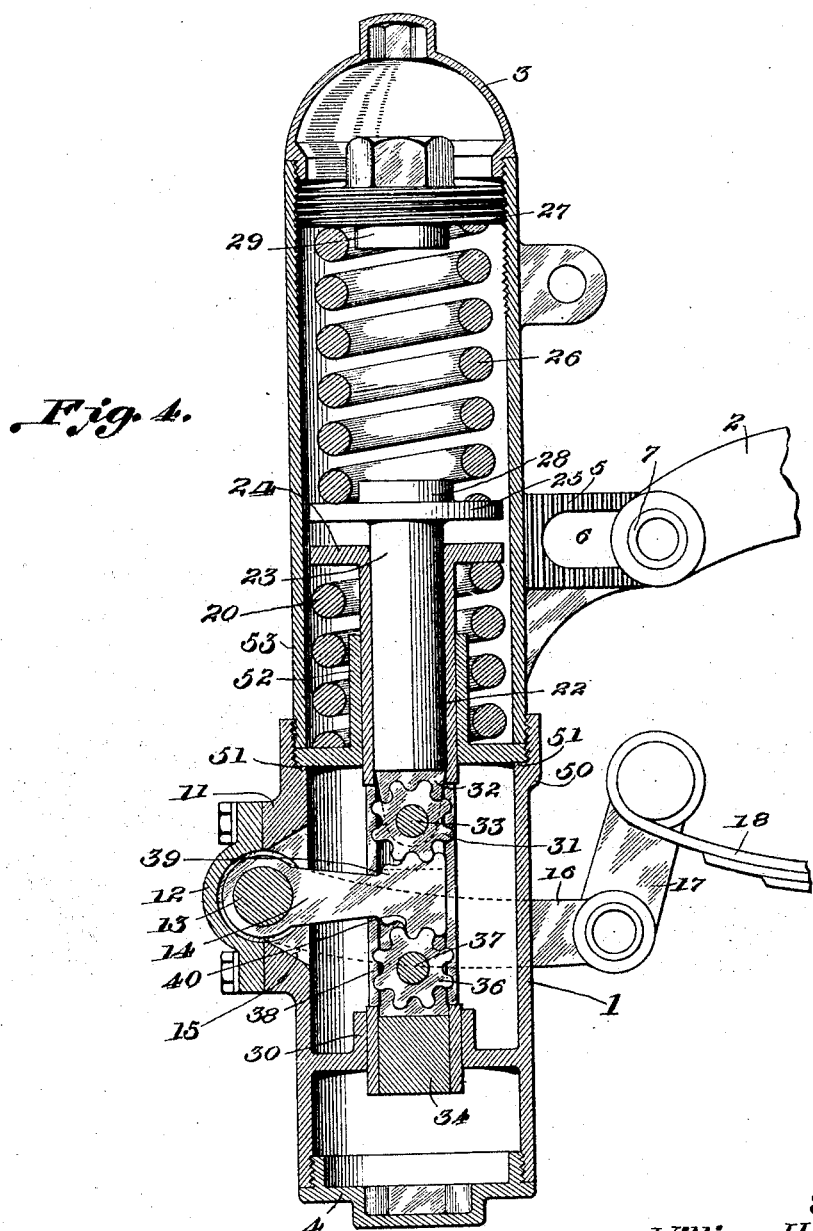

1,586,392

UNITED STATES PATENT OFFICE.

WILLIAM H. WHISLER, OF HOUSTON, TEXAS.

SHOCK ABSORBER.

Application filed February 16, 1924. Serial No. 693,234.

My invention relates particularly to shock absorbers of the type in which a pivoted lever is operatively associated with oppositely acting spring elements to afford a cushioning action for both the shock and rebound.

More specifically, the invention is a modification or improvement of the construction disclosed in my copending application, Serial No. 603,828, filed November 28, 1922, now Patent No. 1,501,382, dated July 15, 1924, wherein a pivoted lever engages a pivoted bearing member carried by a spring tensioning device and exerts a variable leverage action against the cushioning means.

One of the principal objects of my invention is the provision of a shock absorber of this general type in which the lever arm, through engagement with pivoted bearing members, acts upon and reciprocates a pair of movable rods or equivalent members against their respective cushioning springs, the reciprocating rods being so short as to present little opportunity for distortion or displacement and so arranged that the proper alignment of the movable parts is effectively maintained.

A further object is the provision of a shock absorber of this type possessing unusual compactness, strength and reliability by virtue of a telescoping arrangement of the pair of reciprocable rods which form a part of the operative connection between the pivoted lever and the cushioning springs.

A further object is the provision of a shock absorber in which a lever arm engaging pivoted bearing members carried by reciprocable rods is effectively guided and maintained in engagement with such bearing members.

A still further object of the invention is the provision of a device of this character in which a novel and effective guide means is afforded for each of the reciprocable rods.

Another object of the invention is the provision of a shock absorber in which a lever arm operates upon and reciprocates a pair of spring-pressed rods, and in which all of the parts within the housing are separate and removable from the housing structure and completely enclosed thereby.

A still further object is the provision of adjustable means for securing the shock absorber housing to the frame of a vehicle to render the device adaptable to frames of different lengths.

These and other desirable results are obtained by the construction described in detail in the specification and illustrated in the drawings forming a part hereof, wherein Figure 1 is a central vertical sectional view of the device, Figure 2 is a transverse sectional view taken on line 2—2 of Figure 1, Figure 3 is a view of the lower part of the device, partly in elevation and partly in section, at right angles to the view in Figure 1, and Figure 4 is a view similar to Figure 1 and of a modified form of the device.

The device is primarily designed and intended for use on motor vehicles, although it is capable of use in connection with many other structures or apparatus having relatively movable parts.

The working parts of the device are preferably enclosed in a tubular housing 1 adapted to be attached to a vehicle frame 2, the parts being protected by a detachable cap 3 upon the upper end of the housing and a similar plug 4 at the lower end. The housing is preferably secured to the vehicle frame by means of spaced lateral arms or brackets 5, each formed with a slot 6 to receive an adjustable bushing 7 retained in the slot by a spacer nut 8. By moving the bushings in their slots the housing may be secured in proper vertical position to frames of different lengths, the parts being maintained in adjusted position by engagement of the teeth 9 formed on the face of the spacer nut with corresponding teeth 10 on the lateral arms 5. The spacer nuts may be removed and replaced by similar nuts of different thicknesses, if desired.

The housing, at the side opposite the lateral arms 5, has a lateral offset portion 11, which, with a removable plate 12, provides a support for the rotatable shaft 13. A lever arm 14 attached to the shaft projects into the interior of the housing through an opening 15 in its wall. The shaft 13 has fixed to its respective ends arms 16, arranged on opposite sides of the housing and together forming a yoke extending beyond the housing at the side opposite the offset part 12. The free ends of the arms are connected by means of shackle 17 to the vehicle spring 18.

Within the housing is a flange 19 upon which, as a fixed abutment, is mounted a spring 20. In the specific embodiment of the invention illustrated this may be termed the rebound spring.

In the form of the invention shown in Figure 1, the flange 19 is fixed to the housing, by being cast integral therewith or in any other convenient manner, and is extended to form a sleeve 21 which acts as an upper guide or bearing for a pair of telescoping rods 22 and 23, these rods constituting an essential part of the operative connections between the pivoted lever 14 and the cushioning springs 20 and 26.

The hollow rod 22 is provided with a head 24 engaging the upper end of spring 20, the spring tending to maintain the head and its attached rod 22 in elevated position. Instead of the hollow rod, any other suitable tubular member may be used, or even a pair of spaced arms depending from head 24.

Rod 23 is also provided with a head 25 engaging and supporting a spring 26 which bears at its opposite end against a plug 27 and which tends to maintain the head 25 and its rod 23 in depressed position. Head 25 has upon its upper side a boss 28 adapted to abut against a similar boss 29 on the lower side of plug 27 upon extreme movement of rod 23 against spring 26. Undue compression of spring 20 by downward movement of rod 22 is prevented by the stop action of head 24 engaging the upper end of guide sleeve 21. Plug 27 is preferably made removable and adjustable by a screw-threaded connection with the upper portion of the housing. By adjusting the plug up or down in the housing the tension of the spring 26 may be regulated. The heads 24 and 25 constitute movable abutments for the springs 20 and 26, respectively, each spring having a fixed abutment (flange 19 or plug 27) against which it is adapted to be compressed by the action of its movable abutment.

The hollow rod 22, carrying head 24, is slidable within the guide sleeve 21 and is further aligned by means of a guide sleeve 30 provided in the lower part of the housing, preferably as an integral part of the housing structure.

The rod 23, carrying head 25, slides within hollow rod 22 and is bifurcated at its lower end portion to receive a pinion 31 mounted between the forks 32 of the rod and carried on a shaft 33 supported in the forks.

The lower part of the rod 32 has secured within it a block 34, bifuracted at its upper end to receive between its forks 35 a pinion 36 mounted on a pin 37 journaled in the walls of the rod. The latter is slotted at its lower portion. Into this slot 38 the pinions 31 and 36 project and may be rotated, the rod 23 being held against lateral pull and displacement by the pinion 31 working in slot 38, as well as by the guiding or aligning action afforded by the walls of the hollow rod 22 and guide sleeve 21.

Lever 14, projecting into the housing, extend through slot 38 and engages between pinions 31 and 36, the lever arm being provided with rack portions 39, 40, upon its opposite faces to mesh with the teeth of the respective pinions 31 and 36. The lever, by reason of its arrangement with respect to the bearing members (pinions 31 and 36) it engages, exerts a variable leverage action against the cushioning springs through shifting of its fulcrum point.

Engagement of the lever 14 with the bearing members and consequent proper functioning of the device is made positive and certain by the meshing of the oppositely disposed rack faces 39 and 40 of the lever 14 with the pinions 31 and 36, respectively.

The forks 35 between which the lever arm 14 projects also serve as a guide for the lever and prevent the possibility of the lever becoming removed from its meshing engagement with the pinions.

The construction of the device shown in Figure 4 is the same as that illustrated in Figures 1, 2 and 3, except with respect to the structure of the guide sleeve for the reciprocable rods and its arrangement relative to the housing. In Figure 1 the guide sleeve is shown as formed integral with the housing. In Figure 4 the housing in its lower part has an offset portion 50 forming a seat 51 for a removable guide member 52 otherwise similar to the guide sleeve 21 of the Figure 1 form of device. In the Figure 4 device the housing has a removable cap 53 which may be screwed in or otherwise secured within the offset part 50 and which when thus put in place, clamps and securely holds the guide member 52 in its proper position.

In the operation of the device, connected to a vehicle in the manner shown in the drawing, when the chassis frame moves downward or the vehicle spring 18 moves up, an upward motion is imparted to the adjacent end of arms 16, 16, rotating shaft 13 and causing an upward movement of lever arm 14 and a corresponding upward movement of rod 23 and its head 25 against the absorbing spring 26. As the lever arm 14 moves upward its point of contact with the pinion 36 moves outward toward the free end of the lever, thus varying the leverage and increasing the tension on spring 26. The shock is thus gradually absorbed by the increase of tension, due to compression of spring 26 and to the decrease in the relative leverage action of arms 16 with respect to lever arm 14.

In like manner the combined action of decreasing the leverage of arms 16 over arm 14 and increasing the tension of the rebound spring 20, absorbs the rebound of the shock with an exceedingly smooth action. As the chassis frame 2 moves upward or the vehicle spring 18 moves downward a downward movement is imparted, through shackle 17, to the arms 16 and is transmitted through shaft 13 and lever arm 14 to pinion 36 and the rod 22 on which the pinion is mounted. This downward movement of rod 22 causes its head 24 to compress the rebound spring 20. As this operation continues the point of contact between lever arm 14 and pinion 36 moves outward. Thus the leverage of arms 16 over lever arm 14 is decreased at the same time that the tension of the rebound spring is increased by the increased downward movement of rod 22 and its head 24.

I claim:

1. In a shock absorber, a support, a lever pivoted on the support, the lever and support being adapted to be connected to relatively movable parts of a vehicle, a pair of abutments movable relative to the support and to each other, telescoping operating members connected to said movable abutments and adapted to be engaged by the pivoted lever, and resilient means engaging the movable abutments and tending to hold their respective operating members in engagement with the pivoted lever.

2. In a shock absorber, a housing, a pair of movable abutments within said housing, oppositely acting coil springs supported in said housing and engaging the respective abutments, telescoping rods connected to said abutments, pivoted bearing members on each of said rods, and a pivoted lever projecting within the housing and engaging said bearing members.

3. In a shock absorber, a support, a lever pivoted thereon, a movable abutment, a reciprocable rod connected to said abutment, a pivoted rack member carried by the rod, a second movable abutment, an operating member connected to the second abutment and slidable on the reciprocable rod, a pivoted rack member carried by said operating member, a pivoted lever having oppositely disposed rack faces adapted to mesh with said rack members, and a coil spring engaging each of the movable abutments and tending to hold the rack members against the lever.

4. In a shock absorber, a support, a lever, pivoted thereon, a movable abutment, a reciprocable rod connected to said abutment, a pivoted rack member carried by the rod, a second movable abutment, a member connected to the second abutment and slidable on the reciprocable rod, said member having an opening in its free end portion and a pivoted rack member thereon, the pivoted lever projecting into the opening in said slidable member and having oppositely disposed rack faces adapted to mesh with said rack members, and a coil spring engaging each of the movable abutments and tending to hold the rack members against the lever.

5. In a shock absorber, a support, a movable abutment, a coil spring engaging said abutment, a rod carrying the movable abutment, a rack member pivotally mounted on the rod, a second movable abutment, a coil spring engaging said second abutment, a tubular member slidably mounted on said rod, said tubular member having an opening in its free end portion, a rack member pivotally mounted on the tubular member, within said opening, the pivoted lever projecting into the opening in the tubular member and having opposite rack faces adapted to mesh with the pivoted rack members.

6. In a shock absorber, a housing, spaced guide sleeves within the housing, a hollow rod slidably mounted in said guide sleeves, a rod slidably mounted in said hollow rod, each of said rods having a head, a pivoted bearing member on each rod, a pivoted lever projecting within said housing and engaging said bearing members and coil springs supported within said housing and engaging said heads and tending to maintain the bearing members in engagement with said lever.

7. In a shock absorber, a housing, a guide sleeve within the housing, a hollow rod slidably mounted in said sleeve, a head on said rod, a coil spring supported below said head and tending to elevate said hollow rod, the lower portion of said rod having an opening in its side and carrying a pivoted rack member, a second rod slidable in the hollow rod and having a head on its upper end above the first-mentioned head and a pivoted rack member on its lower end, a coil spring supported above the upper head and tending to maintain the second rod in depressed position, and a lever pivoted on the housing and projecting through the opening in the hollow rod between said rack members, said lever having oppositely disposed rack faces meshing with said rack members.

W. H. WHISLER.